March 4, 1969  J. M. SWEENEY  3,430,378
WEIGHT AND BAIT HOLDER FOR FISHHOOKS
Filed Nov. 10, 1966

INVENTOR.
JOHN M. SWEENEY
BY
ATTORNEYS

United States Patent Office 3,430,378
Patented Mar. 4, 1969

3,430,378
WEIGHT AND BAIT HOLDER FOR FISHHOOKS
John M. Sweeney, Denver, Colo., assignor to Wright & McGill Co., Denver, Colo., a corporation of Colorado
Filed Nov. 10, 1966, Ser. No. 593,512
U.S. Cl. 43—43.6    3 Claims
Int. Cl. A01k *83/06, 83/00*

ABSTRACT OF THE DISCLOSURE

A combined weight and bait holder for a fishhook including a shank having an eyelet at one end and a pointed hook at its opposite end with a weight member secured on an intermediate shank portion, said weight member having a series of V-type threads along its exterior surface tapering inwardly toward the hook point for threaded attachment of a bait in gripping relationship. A weed-guard may be secured to the shank for covering the hook point when desired.

---

This invention in general relates to fishhooks and more particularly to a novel weight and bait holder for fishhooks.

Various forms of bait and particularly artificial baits such as worms made from synthetic materials have a tendency to slide up and down on the shank of the hook during casting and when drawn through the water. Such a sliding action may result in ineffectiveness of the bait or loss of the bait. Fishing waters such as rivers, lakes, reservoirs, and ponds frequently develop heavy growths of various forms of aquatic vegetation such as weeds, lilies and the like and also may have rocks, submerged wood or dead trees along the bottom. A weed-guarded hook is frequently used on weighted hooks to avoid catching the hook point on such objects which may result in loss of hook, bait, weight and line.

An object of this invention is to provide a novel bait holder suitable for various forms of fishhooks.

Another object of this invention is to provide a combined weight and bait holder which holds and prevents slipping of various forms of bait on a fishhook and particularly artificial bait.

Other objects, advantages and capabilities of the present invention will be apparent from the following description taken in conjunction with the drawings in which.

Figure 1:
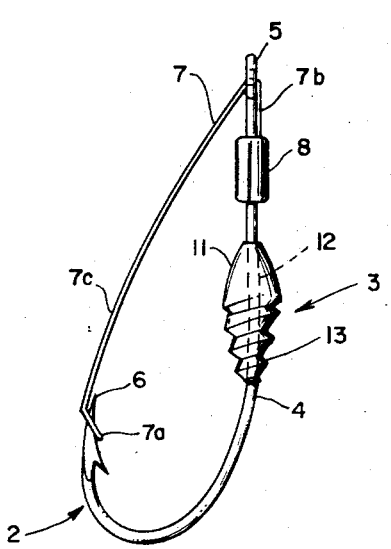
FIG. 1 is a side elevation view of the weight and bait holder secured on the shank portion of a fishhook of the weed-guarded type.
Figure 2:
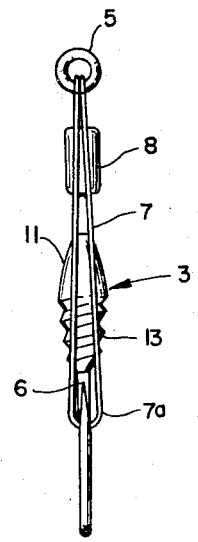
FIG. 2 is a front elevation view of the weight and bait holder shown in FIG. 1.
Figure 4:
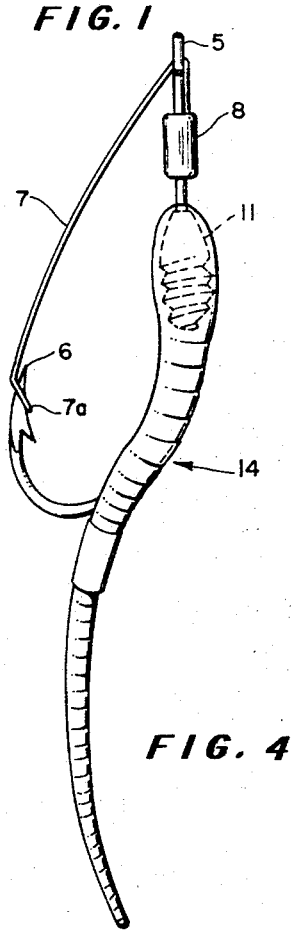
FIG. 4 is a side elevation view of the weight and bait holder shown in FIG. 1 with bait in the form of a worm secured in a gripping relation thereon.
Figure 3:
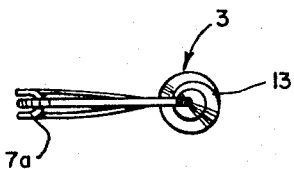
FIG. 3 is an end view of the weight and bait holder shown in FIG. 1.

Referring now to the drawing, there is shown a fishhook having a weight member secured thereon, which are generally designated by numerals 2 and 3, respectively. The fishhook 2 is conventional and includes a shank portion 4 terminating in an eye 5 at one end and a hook point 6 at the other end.

A preferred form of fishhook 2 is illustrated as of the weed-guarded type which also includes a guard member 7 preferably formed from a strand of resilient material such as stainless or spring wire folded about its intermediate portion to form a looped portion 7a at one end. The other end portion 7b is secured to the shank by a fastening member 8 and the guard member 7 extends from end portion 7b along the shank and is bent through the eye 5 and extends outwardly and downwardly therefrom in an intermediate bowed portion 7c so that the guard member is under slight tension during the engagement of the looped portion 7a with an inner surface of the hook to normally cover the hook point. With this arrangement, the hook point is guarded from various objects in the water and the guard will be forced inwardly to expose the hook point when a force is applied to the guard member such as when the mouth of a fish closes on the hook.

The weight member 3 includes a generally elongated body 11 having a central bore 12 surrounding an intermediate portion of the shank and is adapted for securing the body 11 to the shank. This body 11 is preferably of a lead material which is molded or cast onto the shank but other known means may be utilized to secure the weight member to the shank including a detachable fastening arrangement which would allow body 11 to be selectively attached and detached from the hook. The exterior surface of the body 11 is provided with a series of projections and recesses or corrugations 13 which for best results are in the form of V-type threads preferably cast or molded in body 11 tapering inwardly toward the hook point to provide a gripping relation between the bait and hook as hereafter described.

The bait 14 herein illustrated as an artificial worm is attached to the hook 2 and associated weight member 3 by moving an end of the bait through the hook point and along the lengthwise extent of the shank and then threading the bait by rotational movement onto the threads 13 so it is held in a gripping relation thereon leaving a portion of the bait on the shank and the end portion dangling therefrom as illustrated. In this manner, the bait 14 is held by the threads 13 which secure the bait in a gripping relationship and prevent the slipping of the bait toward the eye or the point of the hook.

This shaping of the body 11 and its location on the shank provides the combined features of bait holding and a weight for the line which is particularly suitable for use with a fishhook of the weed-guarded type.

I claim:

1. A weight and bait holder for a fishhook having a shank terminating in an eye at one end and a hook point at the other end, comprising a weight member secured on an intermediate portion of the shank, said weight member having means inclusive of a series of V-type threads along its exterior surface and tapering inwardly toward the hook point for attaching bait in a gripping relationship when said bait is moved through the hook point and drawn along the lengthwise extent of the shank into threaded engagement with the threads of said weight member.

2. In a fishhook including a shank terminating in an eye at one end and a hook point at the other end, the improvement comprising a combined weight and bait holder mounted on an intermediate shank portion, said weight member having means inclusive of a series of V-type threads along its exterior surface and tapering inwardly toward the hook point for attaching bait in a gripping relationship when said bait is moved through the hook point and along the lengthwise extent of the shank into threaded engagement with the threads of said weight member.

3. A weight and bait holder for a weed-guarded fishing hook having a shank terminating in an eye at one end and a hook point at the other end with a resilient weed-guard extending from the eye to the hook point, comprising a weight member secured on an intermediate portion of the shank, said weight member having means inclusive of a series of V-type threads along its exterior surface and tapering inwardly toward the hook point for attaching bait in a gripping relationship when said bait is moved through the hook point and drawn along the lengthwise extent of the shank into threaded engagement with the threads of said weight member.

References Cited

UNITED STATES PATENTS

| | | | |
|---|---|---|---|
| 823,319 | 6/1906 | Cooper | 43—44.8 |
| 2,564,216 | 8/1951 | Stark | 43—44.8 |
| 3,169,338 | 2/1965 | Morin | 43—43.6 |

FOREIGN PATENTS 432,843  8/1935  Great Britain.

SAMUEL KOREN, *Primary Examiner.*
DANIEL J. LEACH, *Assistant Examiner.*

U.S. Cl. X.R.

44—44.8, 44.81